US008347842B2

(12) United States Patent
Sadowski et al.

(10) Patent No.: US 8,347,842 B2
(45) **Date of Patent: *Jan. 8, 2013**

(54) COOLABLE PISTON FOR INTERNAL COMBUSTION ENGINE

(75) Inventors: Michael S. Sadowski, Elmhurst, IL (US); Michael L. Mickelson, Gurnee, IL (US)

(73) Assignee: Federal-Mogul Corporation, Southfield, MI (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/829,743

(22) Filed: Jul. 2, 2010

(65) Prior Publication Data

US 2010/0263620 A1 Oct. 21, 2010

Related U.S. Application Data

(63) Continuation-in-part of application No. 12/033,097, filed on Feb. 19, 2008, now Pat. No. 7,762,227.

(51) Int. Cl.
*F16J 1/14* (2006.01)

(52) U.S. Cl. .................................................... 123/193.6

(58) Field of Classification Search ............... 123/193.6, 123/41.35; 92/186; 29/888.04
See application file for complete search history.

(56) References Cited

U.S. PATENT DOCUMENTS 1,900,521 A 3/1933 Price
2,687,931 A 8/1954 Flynn, Jr.
2,698,210 A 12/1954 Baller
3,221,718 A 12/1965 Isley
3,336,844 A 8/1967 Cornet
3,413,897 A 12/1968 Atkin
3,805,677 A 4/1974 Clary et al.
3,906,924 A 9/1975 Elsbett
4,377,967 A 3/1983 Pelizzoni
4,505,233 A 3/1985 Kanda et al.
4,506,632 A 3/1985 Kanda et al.
4,577,595 A 3/1986 Deutschmann et al.
4,843,698 A 7/1989 Ripberger et al.
4,986,167 A 1/1991 Stratton et al.
5,052,280 A 10/1991 Kopf et al.
5,144,923 A 9/1992 Leites et al.
5,261,363 A 11/1993 Kemnitz
5,357,920 A 10/1994 Kemnitz
5,546,896 A 8/1996 Zaiser
5,778,533 A 7/1998 Kemnitz
5,778,846 A 7/1998 Mielke
6,401,595 B1 * 6/2002 Bochart .......................... 92/186
6,453,797 B1 9/2002 Bauer
6,487,773 B1 12/2002 Scharp et al.

(Continued)

*Primary Examiner* — M. McMahon

(74) *Attorney, Agent, or Firm* — Robert L. Stearns; Dickinson Wright, PLLC

(57) ABSTRACT

A coolable piston includes an annular wall extending between a crown and a lower distal end. First and second shoulders are provided in the wall. The first shoulder extends between first and second inner diameters of the wall. The second shoulder extends between the second and a third inner diameter. A collar is provided on the lower distal end of the wall and flanged over to project radially inwardly. An annular rib depends from the crown, with an annular cavity provided between the rib and the wall. An annular channel is formed in the rib. A ring member at least partially closes the cavity. The ring member is supported against axial movement by an inner periphery of the ring member being received in the annular channel. A locking ring is disposed in the collar against the second shoulder and supports an outer periphery of the ring member against axial movement.

13 Claims, 7 Drawing Sheets

U.S. PATENT DOCUMENTS

| | | | |
|---|---|---|---|
| 6,647,861 | B1 | 11/2003 | Jacobi et al. |
| 6,659,062 | B1 | 12/2003 | Issler |
| 6,701,875 | B2 | 3/2004 | Weng et al. |
| 6,722,263 | B2 | 4/2004 | Keller et al. |
| 6,772,846 | B1 | 8/2004 | Scharp |
| 6,820,582 | B1 | 11/2004 | Gabriel et al. |
| 6,892,690 | B2 | 5/2005 | Gabriel et al. |
| 6,920,860 | B2 | 7/2005 | Gabriel et al. |
| 6,938,604 | B2 | 9/2005 | Gabriel et al. |
| 6,957,638 | B2 | 10/2005 | Scharp |
| 7,131,418 | B2 | 11/2006 | Wieland |
| 7,162,990 | B1 | 1/2007 | Ioja et al. |
| 7,415,959 | B2 | 8/2008 | Scharp |
| 7,762,227 | B2 * | 7/2010 | Sadowski et al. .......... 123/193.6 |

* cited by examiner

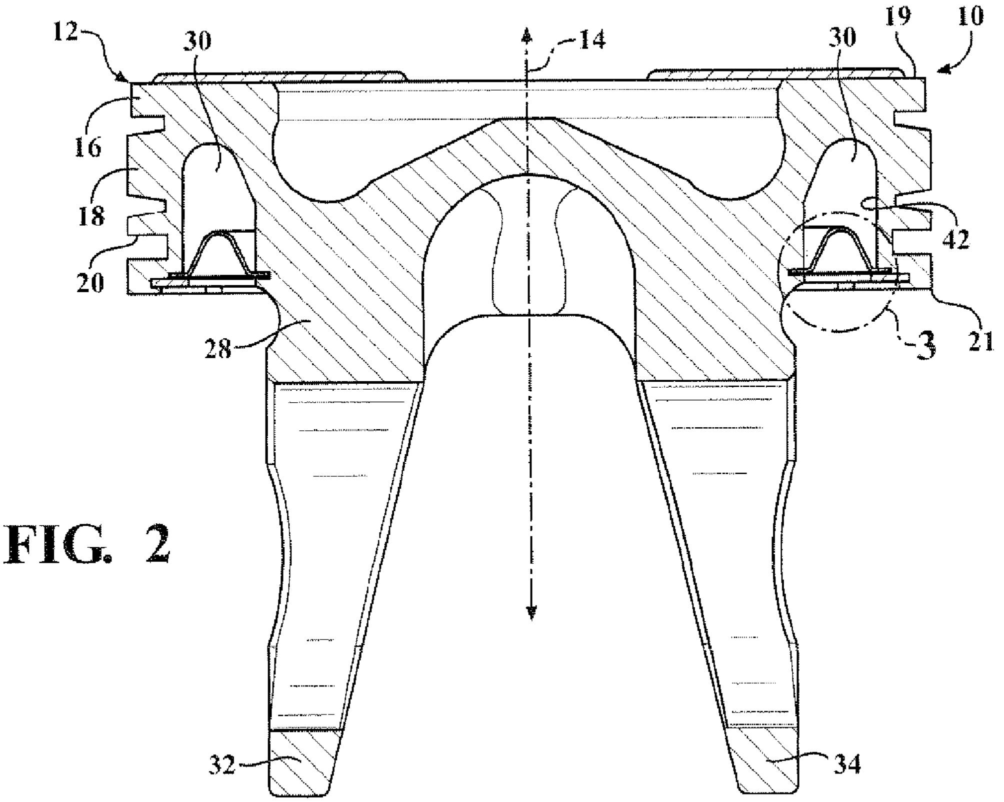
FIG. 2
FIG. 3
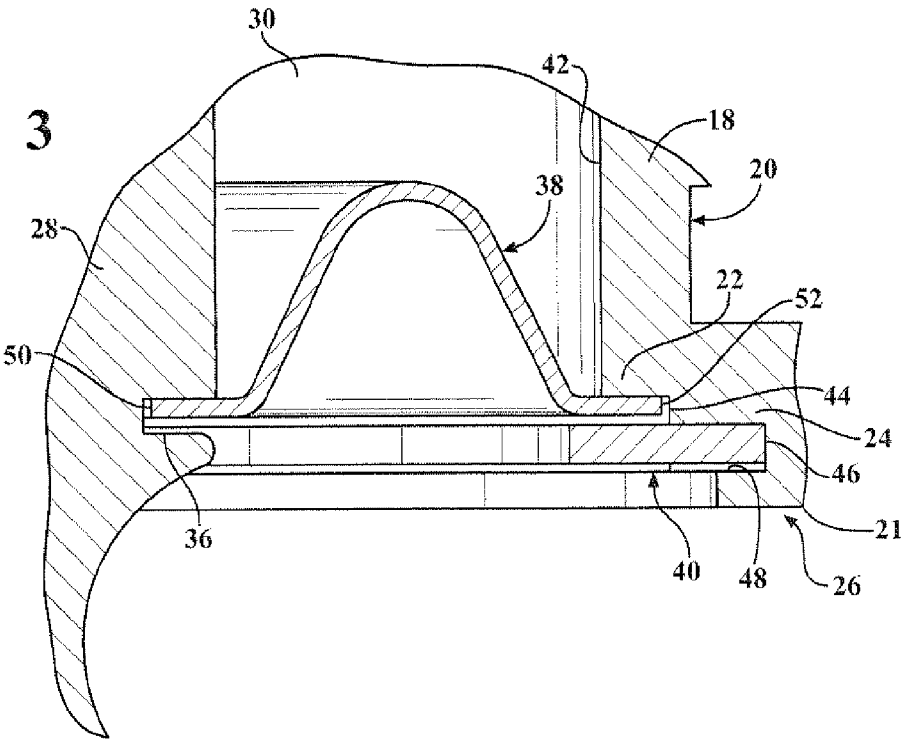

COOLABLE PISTON FOR INTERNAL COMBUSTION ENGINE

CROSS-REFERENCE TO RELATED APPLICATIONS

This is a continuation-in-part of U.S. application Ser. No. 12/033,097, filed Feb. 19, 2008 now U.S. Pat. No. 7,762,227, which is incorporated herein by reference in its entirety.

BACKGROUND OF THE INVENTION

1. Technical Field

The present invention relates to pistons for internal combustion engines, and more particularly to pistons having a cooling chambers.

2. Related Art

A piston assembly for an internal combustion engine generally becomes very hot during operation. And thus, the piston is subjected to relatively severe thermal stresses. For example, the crown of the piston is directly exposed to the most extreme heat in the combustion chamber. The challenges posed by extreme heating of the crown has become more severe with modern internal combustion engines due to increases in the thermal load on the parts resulting from increases in engine power output. Various mechanisms have been developed in an effort to cool piston assemblies. For example, a flow of lubricant can be directed to the underside of the crown from the crank chamber. It has been recognized as desirable in some arrangements to provide a chamber near the lower surface of the piston crown to provide an accumulating pool of lubricant for temporarily and intermittently cooling the piston crown. The lubricant from this pool can be splashed against the piston crown as the piston reciprocates in the cylinder bore. Such a lubricant reservoir may be provided by a part of the piston assembly which is integrally formed or cast with the piston main body itself or is welded thereto. And, although some efforts have been generally effective in providing the cooling to the crown region, advances are still sought, particularly with regard to economical aspects of fabricating the cooling chambers.

SUMMARY OF THE INVENTION

A piston for an internal combustion engine includes a head portion having an annular wall extending along a central longitudinal axis between a crown at an upper proximal end and a lower distal end. A first shoulder is provided in the annular wall. The first shoulder extends between a first inner diameter of the annular wall and a second inner diameter of said annular wall. A second shoulder is provided in the annular wall adjacent the first shoulder. The second shoulder extends between the second inner diameter of the annular wall and a third inner diameter of the annular wall. A collar is provided on the lower distal end of the annular wall and flanged over to project radially inwardly toward the central longitudinal axis. An annular rib depends from the crown within the annular wall and provides an annular cavity between the annular rib and the annular wall. The annular cavity extends along the central longitudinal axis from a first end closed by the crown to an open second end. First and second pin bosses are provided at a distal end of the annular rib. An annular channel is formed in the annular rib. A ring member at least partially closes the second end of the annular cavity. The ring member is supported against movement along the longitudinal axis by an inner periphery of the ring member received in the annular channel and has an outer periphery disposed between the first shoulder and the second shoulder. A locking ring is disposed in the collar against the second shoulder and supports the outer periphery of the ring member against movement along the central longitudinal axis.

In accordance with another aspect of the invention, the ring member includes first and second ring members that extend less than 180 degrees to provide at least one coolant flow path into and out of the annular cavity.

In accordance with another aspect of the invention, the ring member has an anti-rotation feature extending radially outwardly from the outer periphery for engagement with the annular wall to prevent relative rotation between the ring member and the annular wall to maintain the coolant flow path in a predetermined location.

In accordance with another aspect of the invention, the ring member includes first and second ring members that extend 180 degrees wherein at least one of the ring members has a through opening providing a coolant flow path into and out of the annular cavity.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 2 is a cross-sectional view taken generally along line 2-2 of FIG. 1;

FIG. 3 is a detail view taken generally along line 3 of FIG. 2;

DETAILED DESCRIPTION OF PRESENTLY PREFERRED EMBODIMENTS

Figure 1:
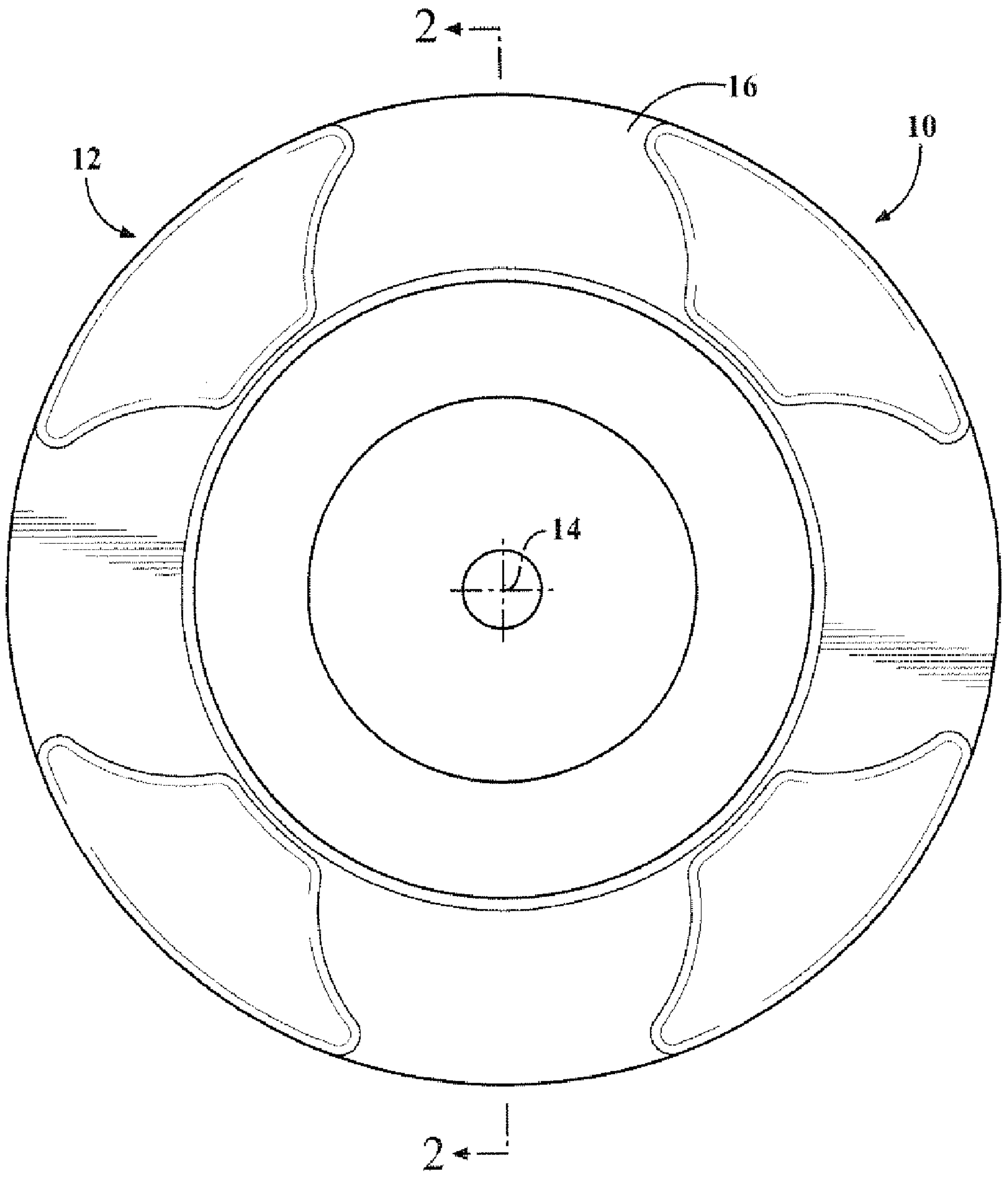
FIG. 1 is a top view of a piston constructed in accordance with one aspect of the invention.

A plurality of different embodiments embodying different aspects of the invention are shown in the Figures of the application. Similar features are shown in the various embodiments of the invention, which have been numbered with a common reference numeral and differentiated by an alphabetic suffix. Also, to enhance consistency, the structures in any particular drawing share the same alphabetic suffix even if the a particular feature is shown in less than all embodiments. Similar features are structured similarly, operate similarly, and/or have the same function unless otherwise indicated by the drawings or in this description. Furthermore, particular features of one embodiment can replace corresponding features in another embodiment unless otherwise indicated by the drawings or this description.

Referring now to FIGS. 1-2, a coolable piston for an internal combustion engine is shown at 10. The piston 10 includes a head portion 12 having a crown 16 at an upper proximal end 19 of an annular wall 18, wherein the annular wall 18 extends along a longitudinal axis 14 to a lower distal end 21. The annular wall 18 is unitary and integrally-formed with respect to the crown 16 and has at least one ring groove 20 for receipt of a piston ring (not shown). The head portion 12 can be formed from any material appropriate for the intended operating environment.

As best shown in FIG. 3, a first shoulder 22 is formed in the annular wall 18 adjacent the lower distal end 21. The annular wall 18 includes an inner surface having a plurality of different diameters. A first portion 42 of the inner surface of the annular wall 18 defines a first inner diameter. A second portion 44 of the inner surface of the annular wall 18 defines a second inner diameter. The first inner diameter is less than the second inner diameter. The first shoulder 22 extends laterally between and is provided by the first and second portions 42, 44 of the annular wall 18.

A second shoulder 24 is also formed in the annular wall 18 adjacent the lower distal end 21 below and immediately adjacent the first shoulder 22. A third portion 46 of the inner surface of the annular wall 18 defines a third inner diameter. The second inner diameter is less than the third inner diameter. The second shoulder 24 extends laterally between and is provided by the second and third portions 44, 46 of the annular wall 18. The second shoulder 24 in the annular wall 18 is adjacent the first shoulder 22 along the longitudinal axis 14, wherein the shoulders 22, 24 are configured in concentric, stepped relation with one another.

A collar 26 is formed at the distal end 21 of the annular wall 18. The collar 26 flanges over to project radially inwardly from the distal end 21 toward the central longitudinal axis 14. The collar 26 thus forms an annular recess or channel, referred to hereafter as notch 48, wherein the notch 48 is closed by the annular wall 18 and faces radially-inward.

The piston 10 also includes an annular rib 28 extending axially downwardly from the crown 16. The annular rib 28 extends within the annular wall 18, and thereby, an annular cavity 30 is provided between the annular rib 28 and the annular wall 18. The annular cavity 30 extends along the longitudinal axis 14 from an upper closed first end, which is closed by the crown 16, to a lower open second end at the distal end 21 of the annular wall 18.

The piston 10 also includes first and second pin bosses 32, 34 provided at a distal end of the annular rib 28 spaced axially downwardly from the crown 16. The first and second pin bosses 32, 34 are configured to receive a pin for connection to a connecting rod (not shown). The first and second pin bosses 32, 34 in the exemplary embodiment of the invention are unitary and integrally-formed with respect to the crown 16.

An annular notch, referred to hereafter as annular channel 36, facing radially-outward is formed in the annular rib 28. The annular channel 36 radially opposes or substantially opposes the first shoulder 22 along the longitudinal axis 14, such that the channel 36 and the first shoulder 22 are radially aligned or substantially radially aligned with one another. That the channel 36 is in radially mirrored or substantially radially mirrored relation with the opposing the shoulder 22 is one example of how the broader invention can be practiced, and not the only way for practicing the invention.

A ring member 38 is positioned to at least partially close the open second end of the annular cavity 30. The ring member 38 is releasably engaged with both of the annular rib 28 and the annular wall 18. The ring member 38 can be selectively removed to facilitate servicing the piston 10. The ring member 38 has an inner periphery 50 supported against movement along the longitudinal axis 14 by being received in the annular channel 36. The ring member 38 also has an outer periphery 52 disposed between the first shoulder 22 and the second shoulder 24 along the longitudinal axis 14.

A locking ring 40 is disposed in part within the annular notch 48 of the collar 26. The locking ring 40 extends radially inwardly from the notch 48 and the second shoulder 24 in underlying relation to the first shoulder 22. As such, the locking ring 40 extends radially inwardly from the outer periphery 52 of the ring member 38, wherein the locking ring 40 supports the outer periphery 52 of the ring member 38 against movement along the longitudinal axis 14 away from the first shoulder 22.

Figure 4:
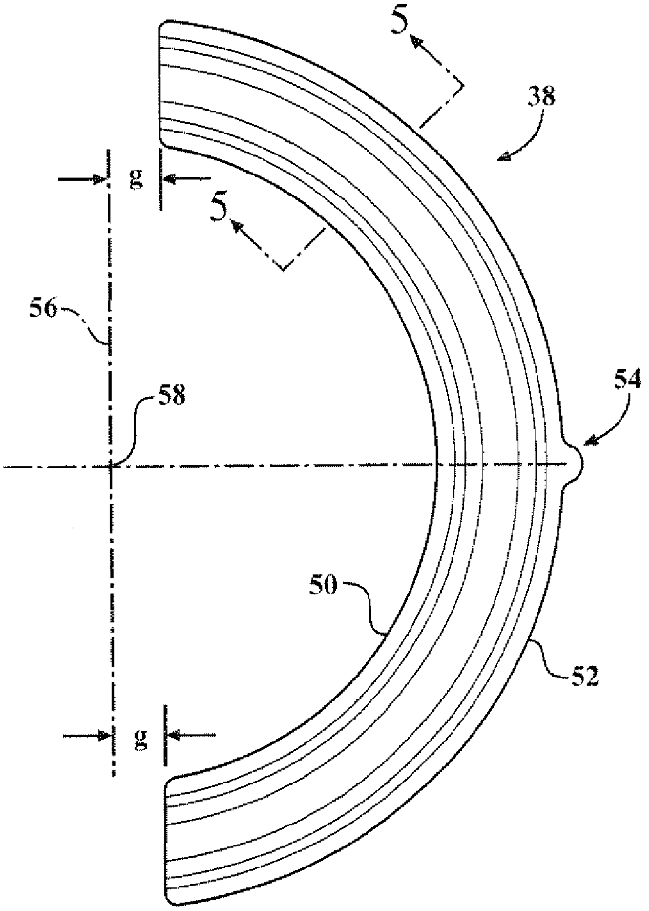
FIG. 4 is top view of a ring member incorporated in the piston of FIG. 1.

In one presently preferred embodiment, the ring member 38 includes first and second half-ring members. FIG. 4 shows one of the half-ring members, designated as 54. A second half-ring member identical to the half-ring member 54 would be disposed to close the annular cavity 30 with the half-ring member 54. As best shown in FIG. 4, each of the first and second half-ring members extend less than 180 degrees. This structural aspect of the half-ring members is shown by the existence of respective gaps (g) between the two ends of the half-ring member 54 and an axis 56 extending through a center 58 of the half-ring member 54. The gaps g between the half-ring members provide a coolant flow path in the form of inlet and outlet ports for cooling lubricant flow.

Figure 5:
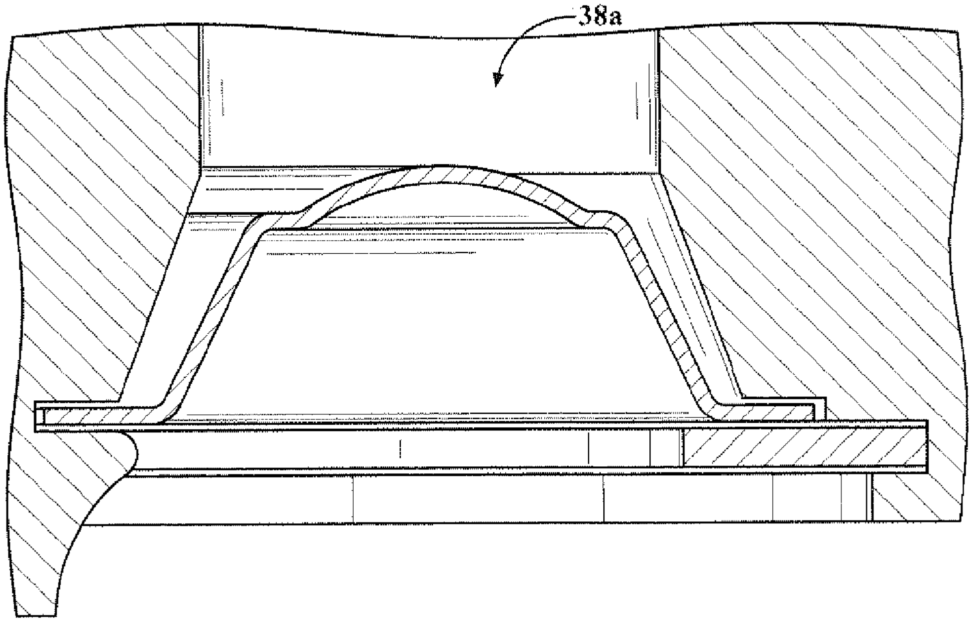
FIG. 5 is a detail view similar to FIG. 3 of a ring member constructed in accordance with another aspect of the invention.
Figure 6:
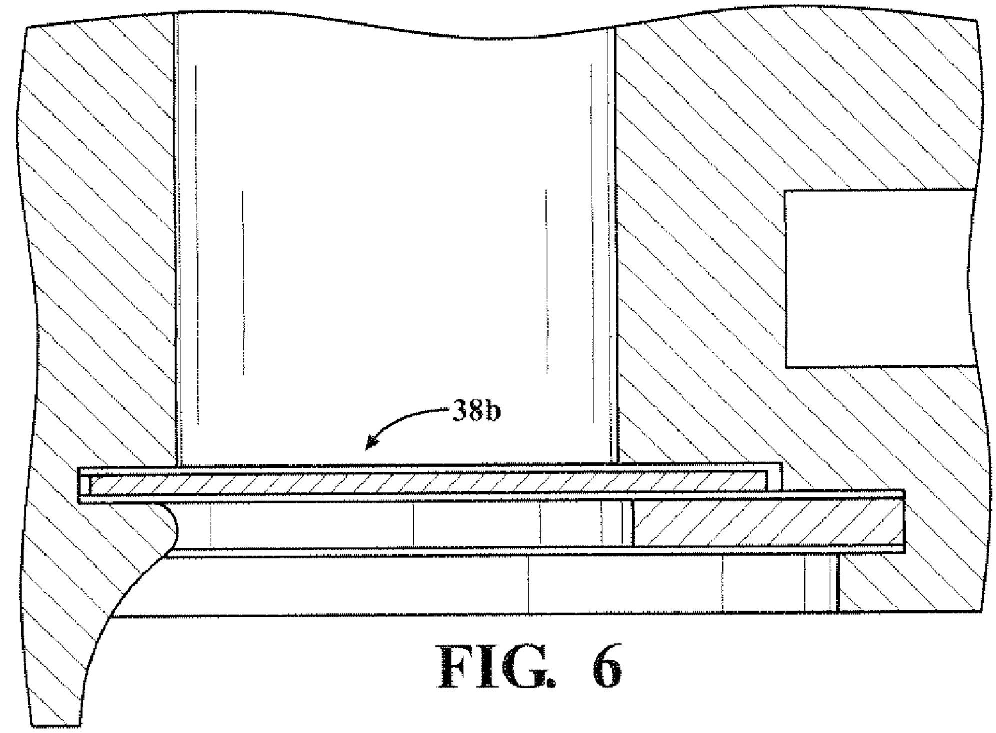
FIG. 6 is a detail view similar to FIG. 3 of a ring member constructed in accordance with yet another aspect of the invention.
Figure 7:
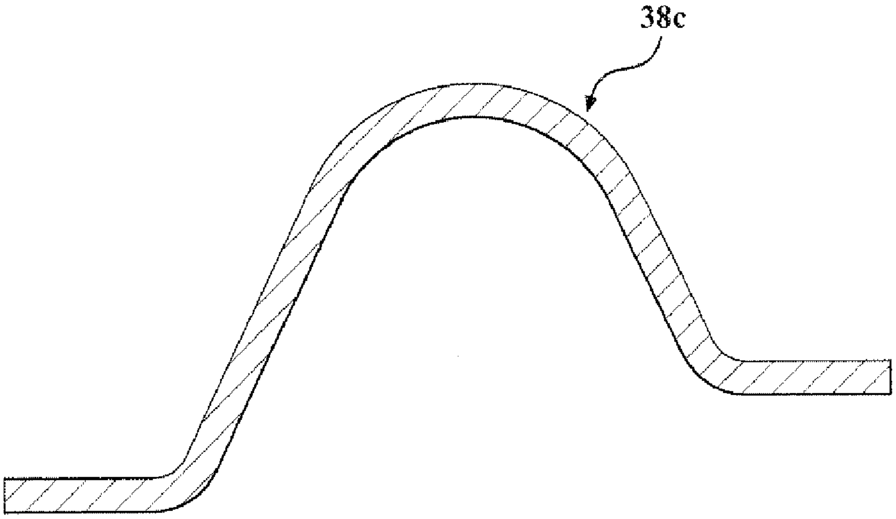
FIG. 7 is a detail view similar to FIG. 3 of a ring member constructed in accordance with yet another aspect of the invention.

FIGS. 2-4 show the ring member 38 having a first cross-section. FIGS. 5-7 show second, third and fourth embodiments of the invention. In these embodiments, respective ring members **38*a*, 38*b*, 38*c* have different cross-sectional configurations. The ring member 38*c* has differently sized legs. The cross-section of the ring member in any particular embodiment can be selected based, at least in part, on the desired flow characteristics of the cooling lubricant in the annular cavity 30**.

Figure 8:
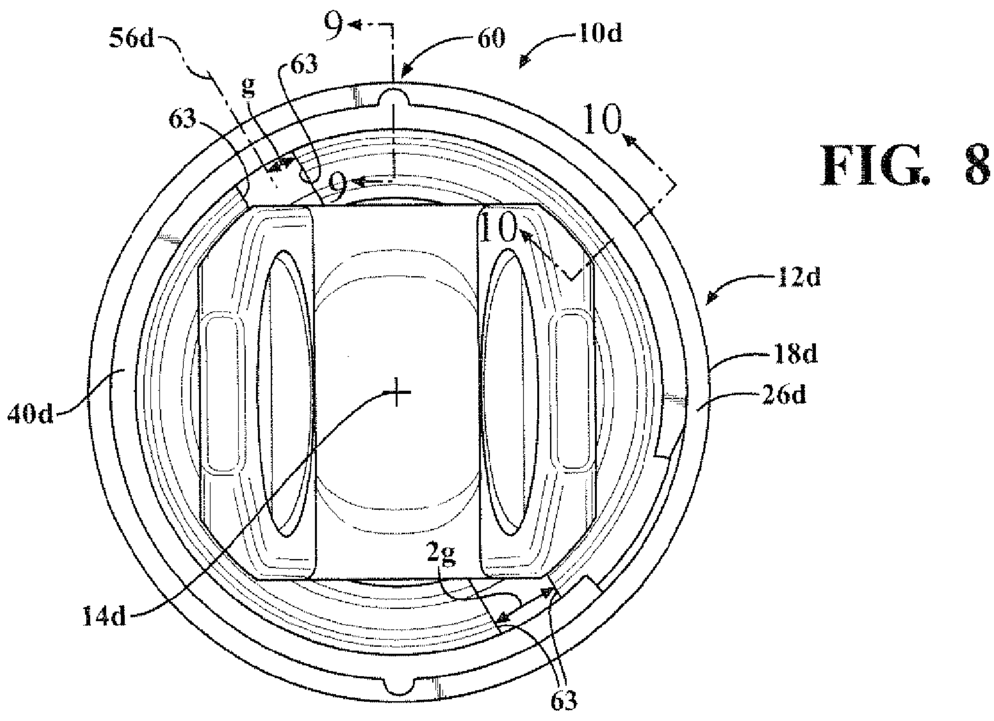
FIG. 8 is a bottom view of a piston constructed in accordance with another aspect of the invention.
Figure 9:
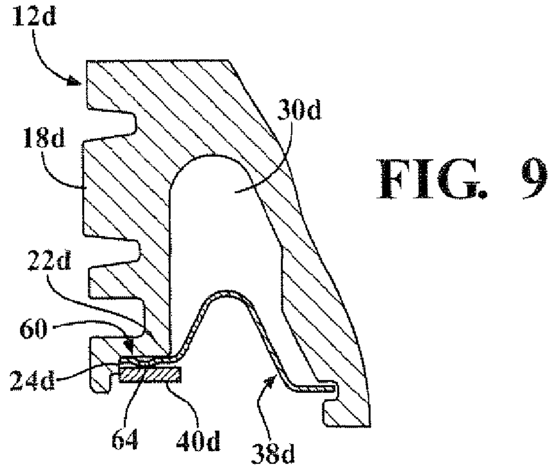
FIG. 9 is a cross-sectional view taken generally along line 9-9 of FIG. 8.
Figure 10:
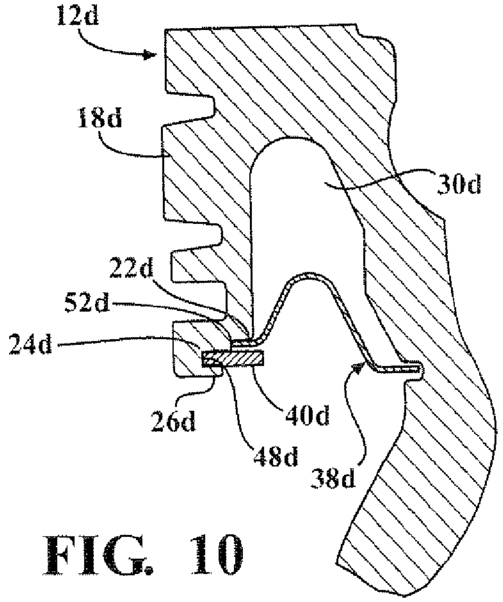
FIG. 10 is a cross-sectional view taken generally along line 10-10 of FIG. 8.
Figure 11:
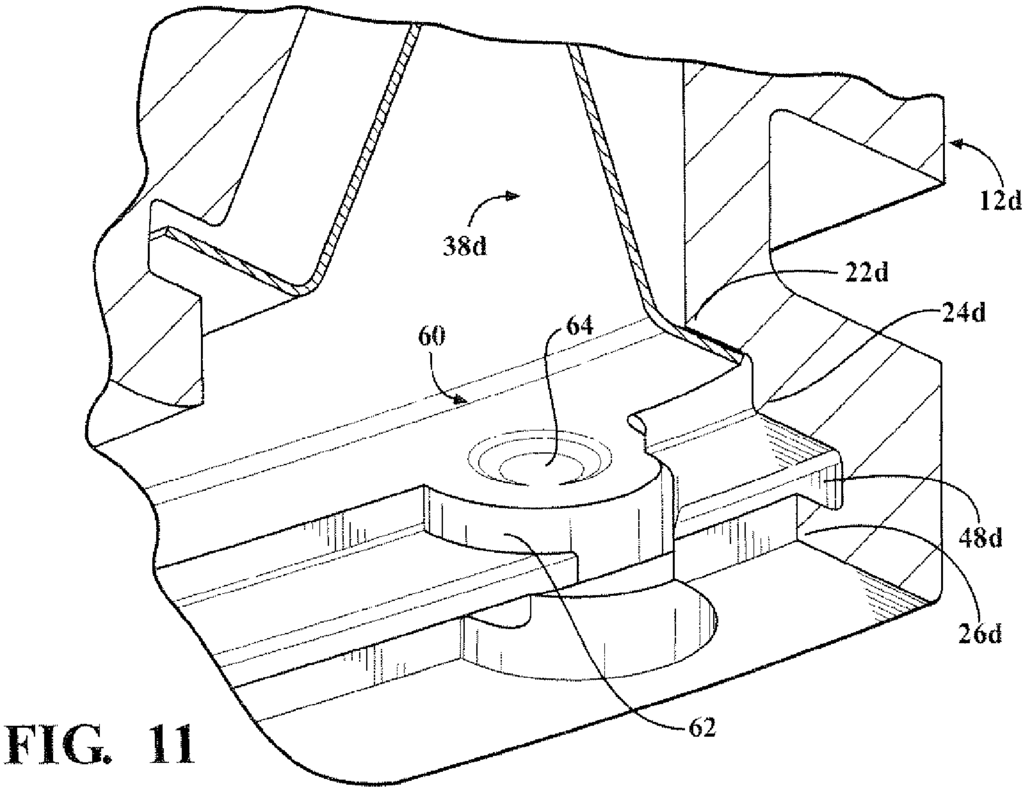
FIG. 11 is a partial perspective view showing an anti-rotation feature of a ring member disposed in a recess of the piston of FIG. 8.
Figure 12:
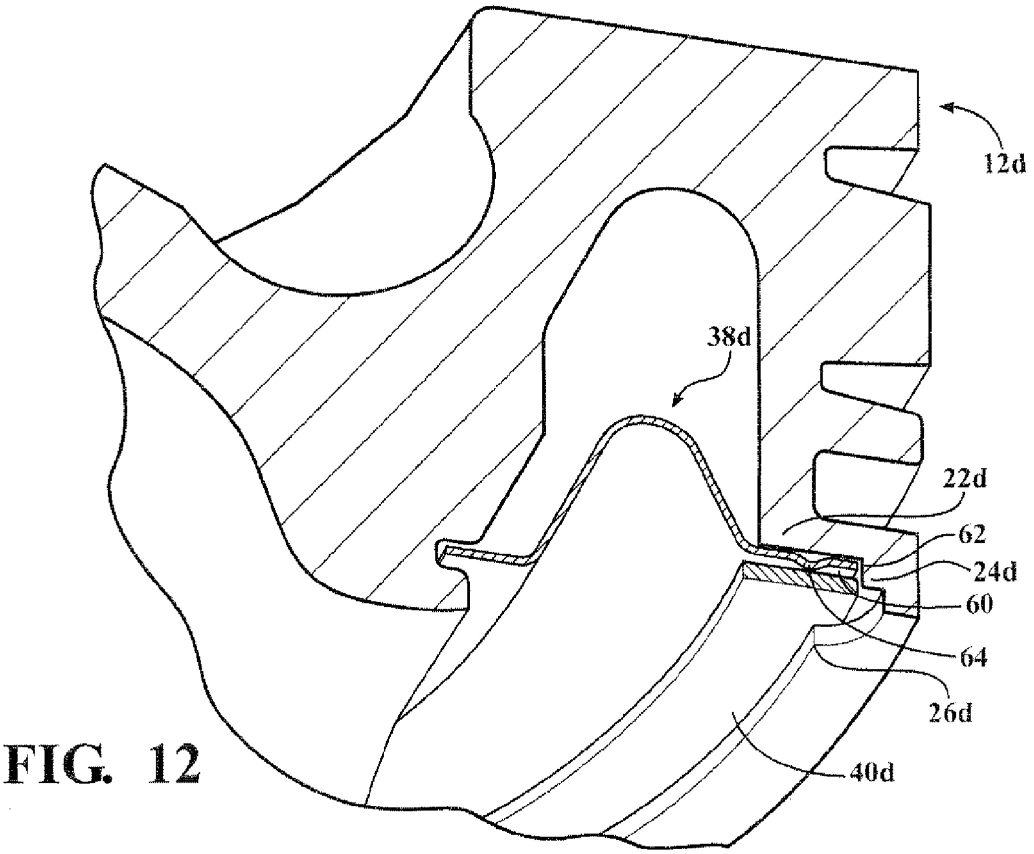
FIG. 12 is a partial perspective view shown a locking ring disposed in an annular channel of a collar of the piston of FIG. 8, with the locking ring maintaining the ring member against axial movement.

In FIG. 8, a bottom view of a piston **10*d* constructed in accordance with another aspect of the invention is shown. The piston 10*d* has a ring member 38*d* constructed similarly as discussed above, however, in addition, to prevent relative rotation between the ring member 38*d* and a piston head portion 12*d*, it also has an anti-rotation feature 60 configured for engagement with an annular wall 18 of the piston 10*d* if rotated about a central longitudinal axis 14 of the piston 10*d*. The anti-rotation feature 60, as best shown in FIGS. 9 and 12, is a tab that extends radially outwardly from an outer periphery 52*d* (FIG. 10) of the ring member 38*d*. The tab 60 is configured for close receipt in a scalloped region of a second shoulder 24*d* of the piston head portion 12*d*, wherein the scallop region is provided by a semicircular shaped recess 62 extending into a portion of the second shoulder 24*d*, as best shown in FIG. 11. The recess 62 is shaped to conform closely with the tab 60, and thus, is semicircular, thereby allowing minimal rotation of the ring member 38*d* relative to the piston head portion 12*d* upon receipt of the tab 60** within the recess

62. It should be recognized other conforming shapes functioning to restrict rotation of the ring members 38*d* can be used, such a rectangular, triangular, ovular, or otherwise. The recess 62 extends radially outwardly from a remaining circumferentially extending portion of the second shoulder 24*d*, as can be seen in comparing FIG. 9 (scallop be present) to FIG. 10 (scallop not present). As such, by preventing the ring members 38*d* from rotating relative to the piston head portion 12*d*, diametrically opposite openings established by the gaps g between opposite ends 63 of the ring members 38*d* are maintained in a predetermined, desired area to allow the desired coolant oil flow into and out of the cooling gallery chamber 30*d*.

To facilitate providing a tight fit between a locking ring 40*d* the ring member 38*d*, the tabs 60 of the ring member 38*d* have raised dimples 64 formed therein. The dimples 64 act as wave springs to maintain a tight axial line-to-line or slight interference fit between the ring member 38*d* and the locking ring 40 upon assembly of the locking ring 40*d* within a notch 48*e* provided by a collar 26*d* of the piston head portion 12*d*. Accordingly, the ring member 38*d* is held against axial movement relative to the piston head portion 12*d* during reciprocation of the piston 10*d*.

Figure 13:
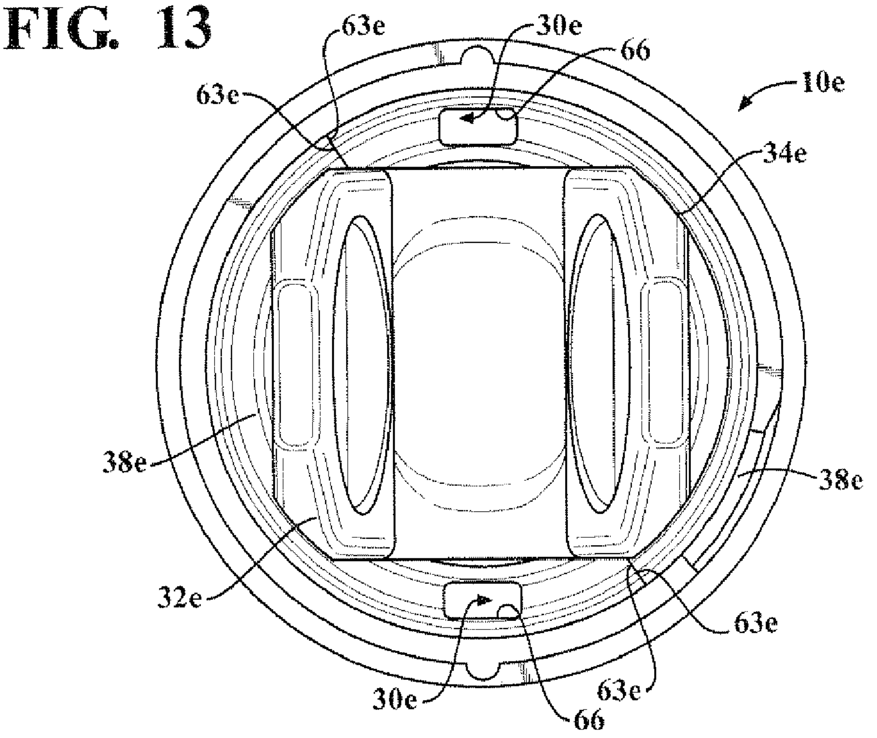
FIG. 13 is a bottom view of a piston constructed in accordance with yet another aspect of the invention.
Figure 14:
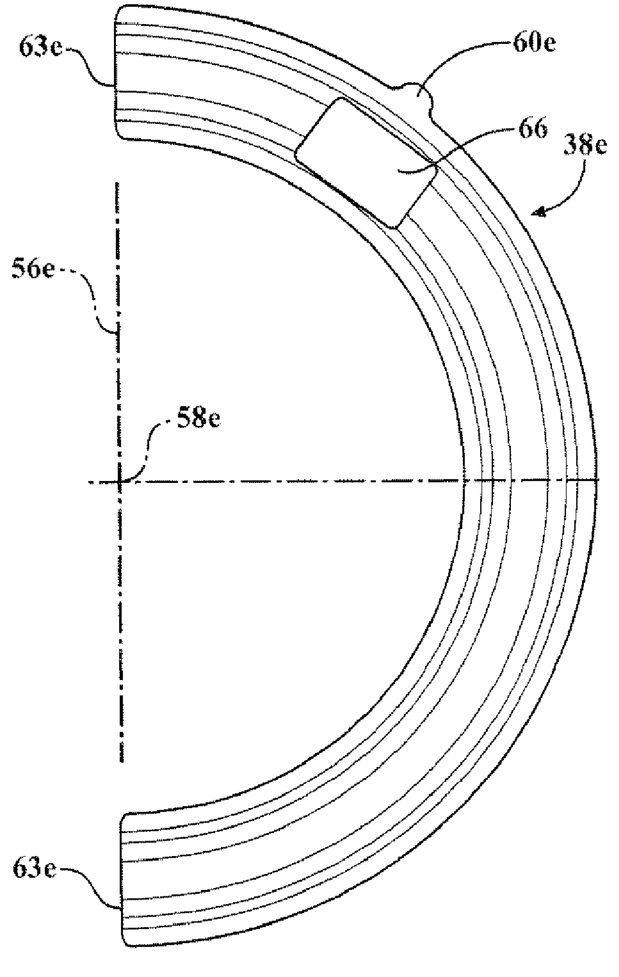
FIG. 14 is a top view of a ring member incorporated in the piston of FIG. 13.

In FIG. 13, a bottom view of a piston 10*e* constructed in accordance with another aspect of the invention is shown. In contrast to the previous embodiment, wherein each ring member extends less than 180 degrees to provide the gap g, each ring member 38*e* is constructed extending over a full, 180 degree semi-circular arc. As such, ends 63*e* of the ring members 38*e* abut one another to fully close off an upper annular oil gallery cavity 30*e*. This structural aspect of the ring members 38*e* is shown by the absence of the gaps (g) discussed above with regard to the ring members 38 of FIG. 4, wherein with the ring members 38*e* an axis 56*e* extending through a center point 58*e* is flush with the ends 63*e* of ring members 38*e*. In order to allow oil flow into and out of the oil gallery cavity 30*e*, at least one coolant flow through opening is formed in at least one of the ring members 38*e*, wherein in the embodiment illustrated, each ring member 38*e* has a coolant flow through opening 66. It should be recognized that the coolant flow through openings 60 are formed in the desired areas to promote optimal coolant flow, particularly on opposite laterally spaced sides of the pin bosses 32*e*, 34*e*.

Obviously, many modifications and variations of the present invention are possible in light of the above teachings. It is, therefore, to be understood that within the scope of the appended claims, the invention may be practiced otherwise than as specifically described.

What is claimed is:

1. A piston for an internal combustion engine, comprising:
   - a head portion having an annular wall extending along a central longitudinal axis between a crown at an upper proximal end and a lower distal end;
   - a first shoulder in said annular wall, said first shoulder extending between a first inner diameter of said annular wall and a second inner diameter of said annular wall;
   - a second shoulder in said annular wall adjacent said first shoulder, said second shoulder extending between said second inner diameter of said annular wall and a third inner diameter of said annular wall;
   - a collar formed on said lower distal end of said annular wall and flanged over to project radially inwardly toward said central longitudinal axis;
   - an annular rib depending from said crown within said annular wall and providing an annular cavity between said annular rib and said annular wall, said annular cavity extending along said central longitudinal axis from a first end closed by said crown to an open second end;
   - first and second pin bosses provided at a distal end of said annular rib;
   - an annular channel formed in said annular rib;
   - a ring member at least partially closing said second end of said annular cavity and being supported against movement along said longitudinal axis by an inner periphery of said ring member received in said annular channel and having an outer periphery disposed between said first shoulder and said second shoulder; and
   - a locking ring disposed in said collar against said second shoulder and supporting said outer periphery of said ring member against movement along said central longitudinal axis.

2. The coolable piston of claim 1 wherein said ring member includes first and Second ring members.

3. The coolable piston of claim 2 wherein each of said first and second ring members extend less than 180 degrees.

4. The coolable piston of claim 3 wherein at least one gap is provided between said ring members, said gap providing coolant flow path into and out of said annular cavity.

5. The coolable piston claim 4 wherein a pair of gaps are provided diametrically opposite one another.

6. The coolable piston of claim 3 wherein said each of said ring members has an anti-rotation feature extending radially outwardly from said outer periphery for engagement with said annular wall to prevent relative rotation between said ring members and said annular wall to maintain said at least one gap in a predetermined location.

7. The coolable piston of claim 6 wherein said second shoulder has a recess configured to receive said anti-rotation feature therein.

8. The coolable piston of claim 2 wherein each of said first and second ring members extend 180 degrees.

9. The coolable piston of claim 8 wherein at least one of said first and second ring members has a through opening providing a coolant flow path into and out of said annular cavity.

10. The coolable piston of claim 1 wherein said ring member has a through opening providing a coolant flow path into and out of said annular cavity.

11. The coolable piston of claim 1 wherein said ring member has an anti-rotation feature extending radially outwardly from said outer periphery for engagement with said annular wall.

12. The coolable piston of claim 11 wherein said second shoulder has a recess configured to receive said anti-rotation feature therein.

13. The coolable piston of claim 12 wherein said anti-rotation feature and said recess in said second shoulder are similarly shaped.

* * * * *